United States Patent
Andersen et al.

(10) Patent No.: US 7,902,686 B2
(45) Date of Patent: Mar. 8, 2011

(54) VARIABLE SPEED WIND TURBINE, A RESONANT CONTROL SYSTEM, A METHOD OF OPERATING A VARIABLE SPEED WIND TURBINE, USE OF A RESONANT CONTROL SYSTEM AND USE OF A METHOD IN A VARIABLE SPEED WIND TURBINE

(75) Inventors: Gert Karmisholt Andersen, Horsens (DK); Kim Brondum Larsen, Hadsund (DK); Flemming Buus Bendixen, Hobro (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/627,703

(22) Filed: Nov. 30, 2009

(65) Prior Publication Data

US 2010/0072751 A1    Mar. 25, 2010

Related U.S. Application Data

(63) Continuation of application No. PCT/DK2008/000200, filed on May 30, 2008.

(60) Provisional application No. 60/941,120, filed on May 31, 2007.

(30) Foreign Application Priority Data

May 31, 2007    (DK) ................................ 2007 00789

(51) Int. Cl.
 *F03D 9/00* (2006.01)
(52) U.S. Cl. ................................ 290/44; 290/55; 416/1

(58) Field of Classification Search .................... 290/43, 290/44, 54, 55; 416/1, 7; 415/4.2
See application file for complete search history.

(56) References Cited

U.S. PATENT DOCUMENTS 4,700,081 A    10/1987    Kos et al.

(Continued)

FOREIGN PATENT DOCUMENTS

EP    0223731 A1    5/1987

(Continued)

OTHER PUBLICATIONS

International Search Report; PCT/DK2008/000200; Mar. 11, 2009; 3 pages.

*Primary Examiner* — Nicholas Ponomarenko
(74) *Attorney, Agent, or Firm* — St. Onge Steward Johnston & Reens LLC (57) ABSTRACT

A variable speed wind turbine connected to a utility grid includes a rotor, having at least one blade, a drive train connected to the rotor, the drive train includes a selection of at least one gear box, and at least one electrical generator, a measuring arrangement establishing at least one rotational speed signal of the drive train, and at least one wind turbine power controller connected to the at least one generator and the utility grid. Furthermore the wind turbine includes at least one resonant controller modifying a power reference value in response to the at least one rotational speed signal. A resonant control system, a method of operating a variable speed wind turbine, use of resonant control system and use of a method in a variable speed wind turbine are also contemplated.

22 Claims, 6 Drawing Sheets

U.S. PATENT DOCUMENTS

| | | | |
|---|---|---|---|
| 6,137,187 A * | 10/2000 | Mikhail et al. | 290/44 |
| 6,420,795 B1 * | 7/2002 | Mikhail et al. | 290/44 |
| 6,608,397 B2 * | 8/2003 | Makino et al. | 290/44 |
| 7,023,105 B2 * | 4/2006 | Wobben | 290/44 |
| 7,180,202 B2 * | 2/2007 | Wobben | 290/44 |
| 7,298,059 B2 * | 11/2007 | Delmerico et al. | 307/85 |
| 7,309,930 B2 * | 12/2007 | Suryanarayanan et al. | 290/55 |
| 7,345,373 B2 * | 3/2008 | Delmerico et al. | 290/44 |
| 7,348,683 B2 * | 3/2008 | Riesberg | 290/1 R |
| 7,586,205 B2 * | 9/2009 | Krueger | 290/44 |
| 7,728,452 B2 * | 6/2010 | Arinaga et al. | 290/44 |
| 2006/0033338 A1 | 2/2006 | Wilson | |
| 2006/0066111 A1 | 3/2006 | Suryanarayanan et al. | |

FOREIGN PATENT DOCUMENTS

| | | |
|---|---|---|
| EP | 1643122 A2 | 4/2006 |
| EP | 1790850 A1 | 5/2007 |
| GB | 2117934 A | 10/1983 |
| WO | 9007823 A1 | 7/1990 |

* cited by examiner

VARIABLE SPEED WIND TURBINE, A RESONANT CONTROL SYSTEM, A METHOD OF OPERATING A VARIABLE SPEED WIND TURBINE, USE OF A RESONANT CONTROL SYSTEM AND USE OF A METHOD IN A VARIABLE SPEED WIND TURBINE

CROSS-REFERENCE TO RELATED APPLICATIONS

The present application is a continuation of pending International patent application PCT/DK2008/000200 filed on May 30, 2008 which designates the United States and claims priority from Danish patent application PA 2007 00789 filed on May 31, 2007 and U.S. Provisional Patent Application Ser. No. 60/941,120 filed on May 31, 2007, the content of which is incorporated herein by reference.

FIELD OF THE INVENTION

The invention relates to a variable speed wind turbine, a resonant control system, a method of operating a variable speed wind turbine, use of a resonant control system and use of a method in a variable speed wind turbine.

BACKGROUND OF THE INVENTION

Generally a wind turbine converts energy in the wind to electrical energy supplied to a utility grid.

As wind acting on a wind turbine rotor produces rotational torque in the drive train of the wind turbine and, the rotor of the wind turbine is influenced by varying wind situations e.g. due to wind shear, alternating mean wind velocities, fluctuating wind, turbulence etc., the rotational speed of the drive train and hereby also the generator varies accordingly. This in turn have an influence on the power quality produced by the wind turbine generator. Furthermore the varying rotational speed may produce a varying mechanical torque in the drive train that can have fatigue influence on mechanical components of the drive train.

US patent application 2006/0066111 discloses a wind turbine vibration damping system that control the torque in the drive train produced by a wind turbine generator, based on information regarding the rotational speed of the generator.

One problem related to this system is that frequencies of the wind turbine, which are desired to dampen, are calculated based on Fourier transformations of a sampled signal indicative of the rotational speed of the generator. A problem related to this problem is that continuous Fourier transformations and calculations are time consuming and takes up computational power of the wind turbine controller and due to time delay the accuracy of dampening is therefore weakened.

It is an object of the present invention to provide an advantageous method of dampening varying rotational vibrations in the drive train of a wind turbine without the above mentioned disadvantages.

SUMMARY OF THE INVENTION

The invention provides a variable speed wind turbine connected to the utility grid including
 a rotor, comprising at least one blade,
 a drive train connected to said rotor, said drive train comprising a selection of at least one gear box, and at least one electrical generator,
 measuring means establishing at least one rotational speed signal of the drive train,
 at least one wind turbine power controller connected to said at least one generator and said utility grid.

Said wind turbine further comprises at least one resonant control means modifying a power reference value in response to said at least one rotational speed signal.

Modifying a power reference value in response to at least one rotational speed signal is advantageous in that, oscillations in the mechanical system of the wind turbine that is influencing e.g. the rotational speed of the wind turbine generator, can be dampened furthermore ensuring that loads on wind turbine components can be minimized.

By using resonant control means it is even further ensured that only oscillations with specific frequencies can be selected ensuring that e.g. oscillations at drive train resonance frequencies are controlled and dampened.

By modifying a power reference value it is even further ensured that the bandwidth of the wind turbine controller system is independent of the bandwidth of the resonant control means and a faster and more accurate drive train oscillation compensation can be achieved e.g. due to different bandwidths of the external power control loop and the internal current/torque control loop.

In one aspect of the invention said resonant control means comprises one or more PID controllers such as one or more resonant PID controllers. By using PID controllers it is ensured that a well known and reliable controller technique is used ensuring that the desired characteristics of the resonant control means are obtained. Furthermore by using a resonant controller it is further ensured that specific frequencies can be selected for dampening and control such as the drive train resonance frequency.

In another aspect of the invention said resonant control means has a relative high gain at one resonance frequency of the drive train. Hereby it is ensured that even small responses or variations in said at least one rotational speed signal at said one resonance frequency results in a high value of feedback signal and thereby the modification of said power reference value which in turn results in a very effective control and/or dampening of said variations.

In yet another aspect of the invention the bandwidth of said resonant control means can be altered by altering at least one operating parameter of said resonant control means. Setting the operating parameters of said resonant control means ensures that the frequency range at which said resonant control means has a relative high gain can be controlled and that the resonant control means can produce an effective response to more close frequencies. By altering at least one of said operating parameters during operation it is furthermore ensured that if e.g. the resonant control means is basically tuned to e.g. the drive train eigen frequency, variations in the actual eigen frequency of the drive train during operation e.g. due to temperature variations can be compensated for and said variations has thereby only minor influence on the control means in order to produce an effective response.

In a further aspect of the invention the gain of said resonant control means at one resonance frequency can be altered by altering at least one operating parameter of said resonant control means e.g. at DC frequency. Hereby it is ensured that the level at which the resonant control means modifies one power reference value can be controlled and the effectiveness of e.g. drive train oscillation dampening can be controlled.

In another aspect of the invention the phase shift of said resonant control means at one resonance frequency of the drive train is substantially zero. Hereby it is ensured that an accurate non-delayed response to one rotational speed signal at one resonance frequency is obtained and that no further phase signal processing is necessary.

In yet another aspect of the invention said resonant control means has a numerical increasing phase shift at frequencies away from one resonance frequency of the drive train. Hereby it is ensured that the impact of the response of the resonant control means is degraded for frequencies away from the resonant frequency of the control means.

In a further aspect of the invention the slope of the phase shift can be altered by altering at least one operating parameter of said resonant control means. Hereby it is ensured that the level at which the response of the resonant control means is degraded for frequencies away from the resonant frequency of the control means, can be controlled further ensuring the possibility of effective dampening of selected resonance frequencies.

In yet another aspect of the invention the transfer function of said resonant control means is on the form:

$$H_{RCM}(S) = K_P + K_i \cdot \frac{2\omega_{CU} S}{S^2 + 2\omega_{CU} S + \omega_{DT}^2}$$

Hereby one implementable embodiment of the invention is ensured and further that operation parameters of the resonant control means can be altered.

In a further aspect of the invention one fundamental resonant frequency of said resonant control means is one resonance frequency of the drive train such as the eigen frequency of the drive train. Hereby it is ensured that the dampening of oscillations with frequencies at or very near the drive train eigen frequency is dampened very effectively which in turn results in lesser loads on the components comprised in the drive train.

In an even further aspect of the invention one fundamental resonant frequency of said resonant control means is a calculated value e.g. a predefined calculated value. Hereby operating parameters of the resonant control means can be applied ensuring an optimal desired response for one fundamental resonance frequency such as one theoretically calculated resonance frequency of the drive train e.g. the drive train eigen frequency.

In a further aspect of the invention one fundamental resonant frequency of said resonant control means is a fixed value or can be altered during operation e.g. adaptive such as to the eigen frequency of the drive train. Hereby it is ensured that one set of operating parameters of the resonant control means can be applied and obtaining an optimal response, taking into account possible operational variations of the wind turbine e.g. due to temperature variations.

In a further aspect of the invention said resonance eigen frequency is a predefined value and/or is estimated. Hereby one set of operational parameters of the resonant control means can be applied once and said means modifies one power reference signal accordingly.

In another aspect of the invention the level of which said at least one control means modifies a power reference value is limited. Hereby it is ensured that the modification of a power reference is limited to a desired and acceptable level.

In yet another aspect of the invention the level of which said at least one control means modifies a power reference value is limited to be within a predefined level. Hereby it is ensured that the modification of a power reference is controlled and limited to a desired and acceptable level in response to e.g. fluctuations of the wind.

In a further aspect of the invention said predefined level is in the range of 0.1 to 25 percent of nominal and/or generated power of said wind turbine such as 5 percent. Hereby it is ensured that the impact of the power reference modification on the generated power is limited and that the generated power will fluctuate only limited as a result of the drive train oscillation compensation control.

In one aspect of the invention said measuring means is an encoder e.g. an encoder operated on a low speed rotor shaft and/or on a generator shaft. Hereby it is ensured that reliable values of the rotational speed are obtained and that the values are measured on influenced components of the drive train.

In another aspect of the invention said measuring means establishes at least one rotational speed signal of the drive train by processing at least one electrical parameter of the wind turbine such as rotor current, stator current etc. Hereby it is ensured that an indirect measure of one rotational speed signal of the drive train is obtained e.g. without separate measuring components. Furthermore it is ensured that parameters already obtained can be used to establish said speed signal.

In yet another aspect of the invention said power reference value is a power reference value of said power controller. Hereby it is ensured that the impact of e.g. fluctuations in rotational speed of the generator is minimized or compensated for without disturbing the common power control system of the wind turbine.

The invention also relates to a resonant control system, a method of operating, use of variable speed wind turbine, and use of a method in a variable speed wind turbine.

BRIEF DESCRIPTION OF THE DRAWINGS

The invention will be described in the following with reference to the figures in which.

DETAILED DESCRIPTION OF THE INVENTION

Figure 1:
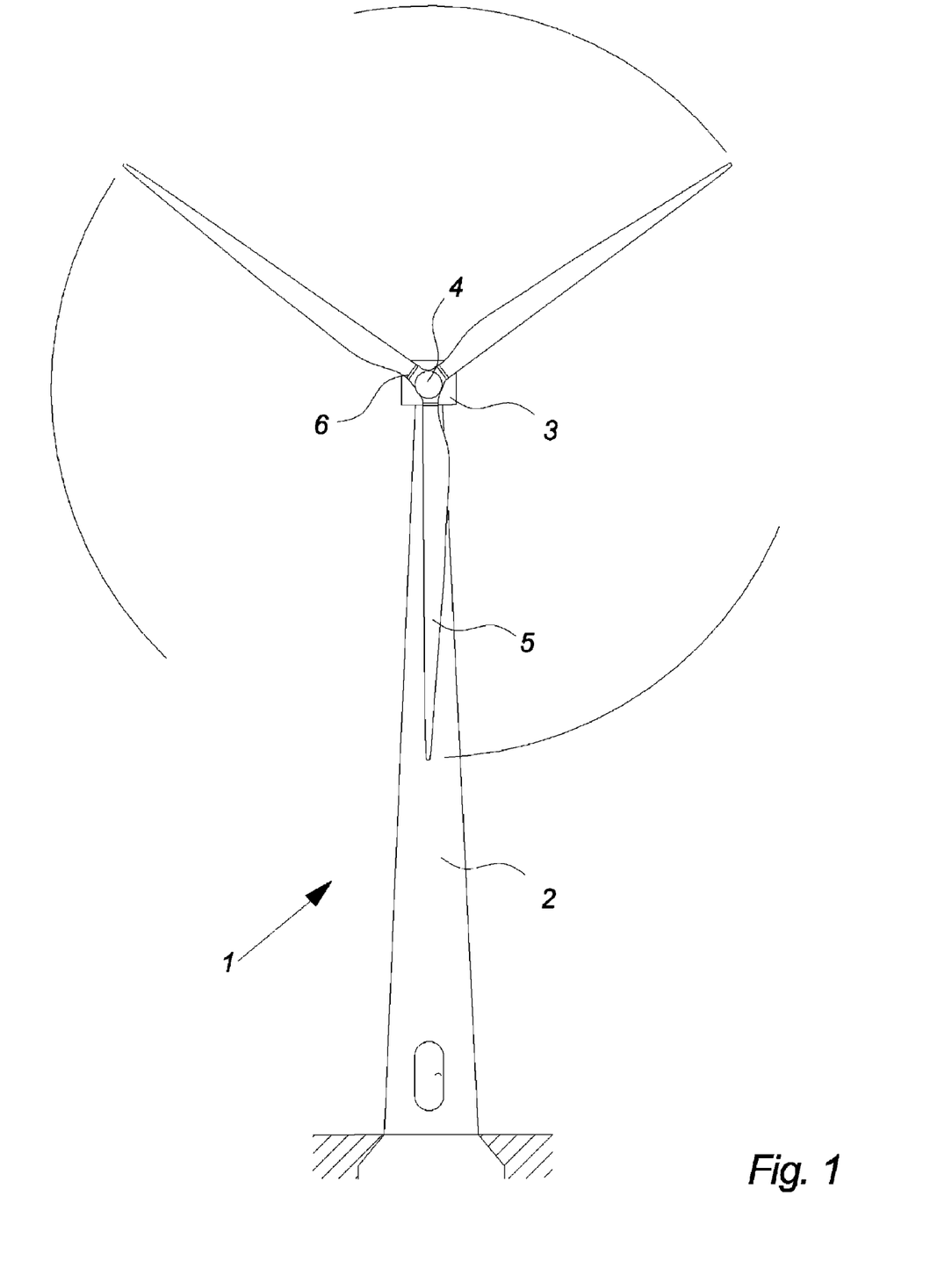
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The pitch process is controlled by a pitch controller.

As illustrated in the figure, wind over a certain level will activate the rotor and allow it to rotate in a perpendicular direction to the wind. The rotation movement is converted to electric power which usually is supplied to the utility grid as will be known by skilled persons within the area.

Figure 2:
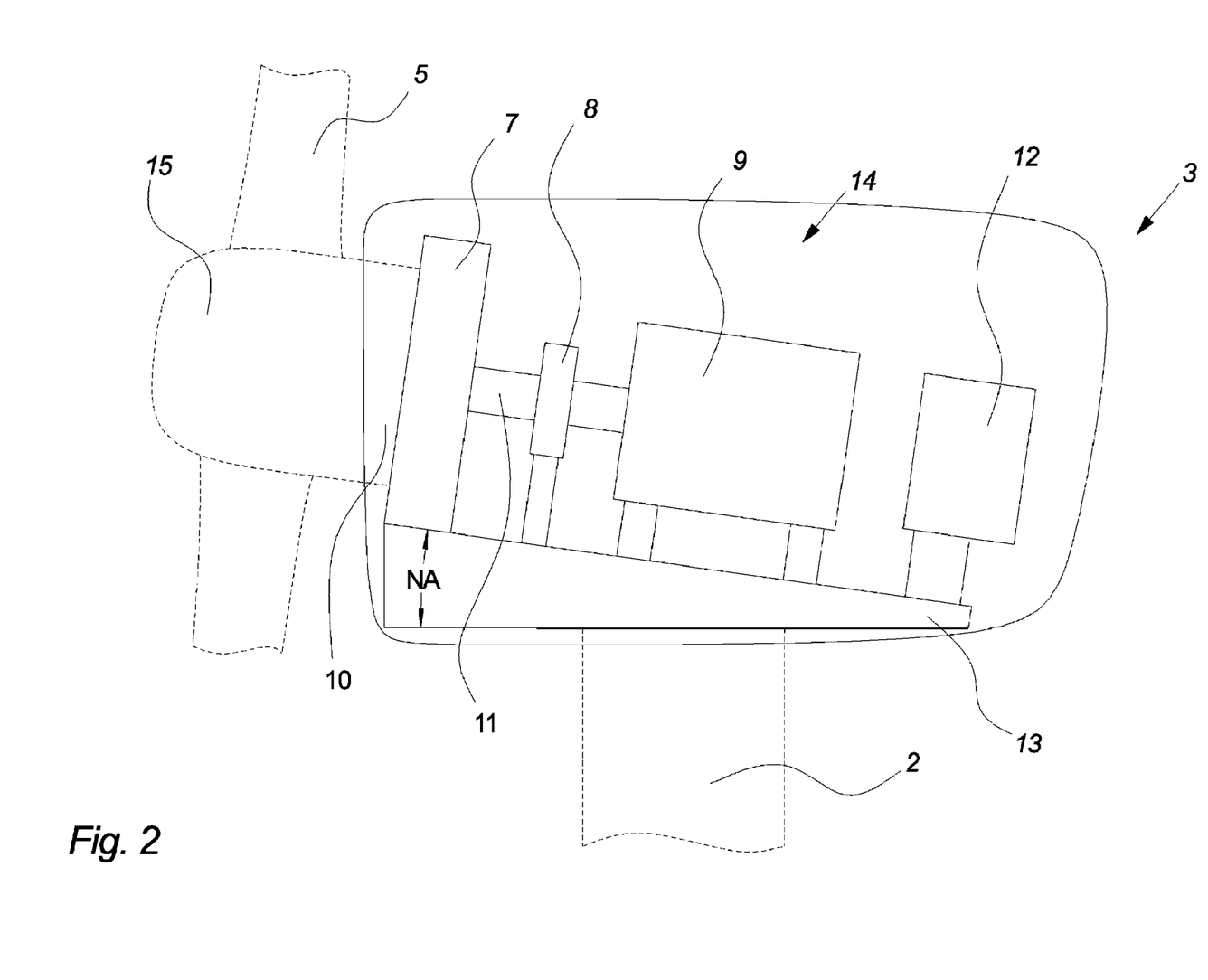
FIG. 2 illustrates schematically a cross section of an embodiment of a simplified nacelle known in the art, as seen from the side.

FIG. 2 illustrates a simplified cross section of a nacelle 3, as seen from the side. The nacelles 3 exists in a multitude of variations and configurations but in most cases the drive train 14 of the nacelle 3 almost always comprises one or more of the following components: a gear 7, a coupling (not shown), some sort of breaking system 8 and a generator 9.

A nacelle 3 of a modern wind turbine 1 can also include a converter 12 (also called an inverter) and additional peripheral equipment such as further power handling equipment, control cabinets, hydraulic systems, cooling systems and more which is not explicitly illustrated on this figure.

The weight of the entire nacelle 3 including the nacelle components 7, 8, 9, 10, 11, 12 is carried by a load carrying structure 13. The components 8, 9, 10, 11, 12 are usually placed on and/or connected to this common load carrying structure 13. In this simplified embodiment the load carrying structure 13 only extends along the bottom of the nacelle 3 e.g. in form of a bed frame to which some or all the components 7, 8, 9, 10, 11, 12 are connected.

In this embodiment of the invention the drive train 14 is established in a normal operation angle NA of 8° in relation a horizontal plane. The drive train is for among other reasons angled to enable that the rotor 15 can be angled correspondingly e.g. to ensure that the blades 5 do not come into collision with the tower 2, to compensate for wind shear etc.

As the rotor is activated by the wind, variations in the wind has an impact on the operation of the wind turbine e.g. on the mechanical forces acting on the drive train 14 in overall and/or the rotational speed of the high speed shaft 11 and the rotational speed of the generator 9 in particular.

The mechanical drive train system 14 behaves as a dynamical mechanical system and may oscillate at its natural eigen frequency and/or harmonics hereof. An oscillation of said mechanical drive train system can be initiated by external influences such as variations or alternations in the wind and may cause unnecessary tear and wear, cause fatigue loads and cause noisy operation.

It is therefore desired to compensate for said variations in the wind and oscillations of the drive train 14.

Figure 3:
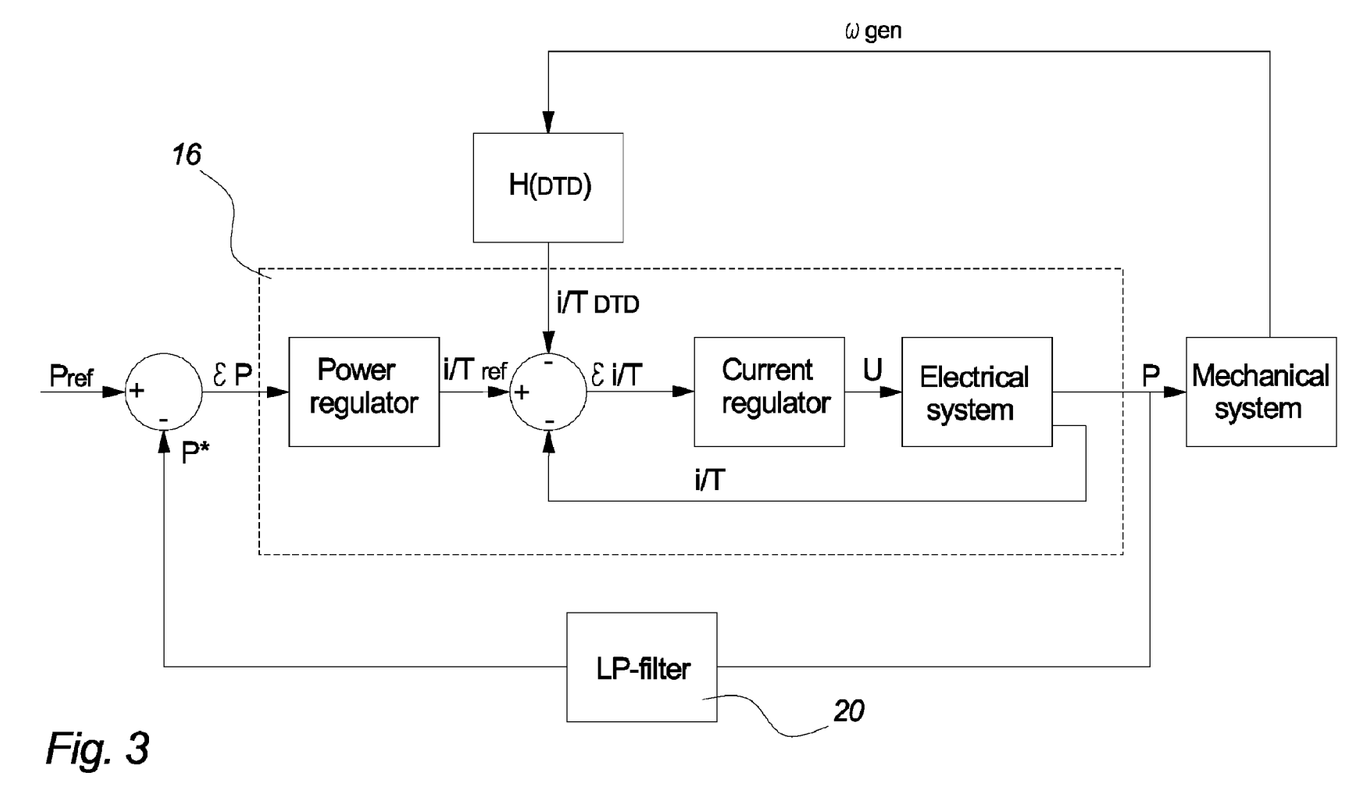
FIG. 3 illustrates schematically a control block diagram of drive train oscillation compensation systems of prior art.

FIG. 3 illustrates schematically a control block diagram of one drive train dampening system for various wind turbines of prior art.

A power reference demand value $P_{ref}$ from e.g. a grid operator, park control, substation or individual wind turbine controller is received at the wind turbine and subtracted by a value of the actual generated power P* resulting in a power error input signal EP to a power controller 16 of the wind turbine.

One role of the power controller 16 is to minimize the power error signal $\epsilon P$ which is achieved by controlling parameters of the schematically illustrated components of the power controller 16.

The actual rotational speed of the generator $\omega_{gen}$ is measured by measuring means and processed via a filter $H_{(DTD)}$ in order to produce a current/torque drive train dampening feedback signal $i/T_{DTD}$ that is fed back to the internal current/torque loop of the power controller 16.

The filter $H_{(DTD)}$ may for various embodiments of prior art comprise FFT algorithms in order to extract information regarding the signal magnitude of the rotational speed of the generator $w_{gen}$ e.g. at the drive train eigen frequency.

One problem related to this prior art is that computations of FFT algorithms with high frequency resolution are very time consuming and therefore the generation of the current/torque feedback signal $i/T_{DTD}$ may be time delayed and non-accurate which in turn decreases the efficiency of dampening.

If the bandwidth of the external power control loop is high compared to the internal current/torque loop the power controller 16 seeks to control to two opposite pointed signals. A standard technique of prior art is therefore to slow down the outer power loop to e.g. 1/10 the bandwidth of the current/torque loop.

If furthermore the current/torque loop is influenced by a drive train dampening signal $i/T_{DTD}$ it might necessary to even further slow down the speed of the power feedback loop e.g. by a LP-filter 20.

The result is a relative slow adaptation to influences on the power loop.

Figure 4:
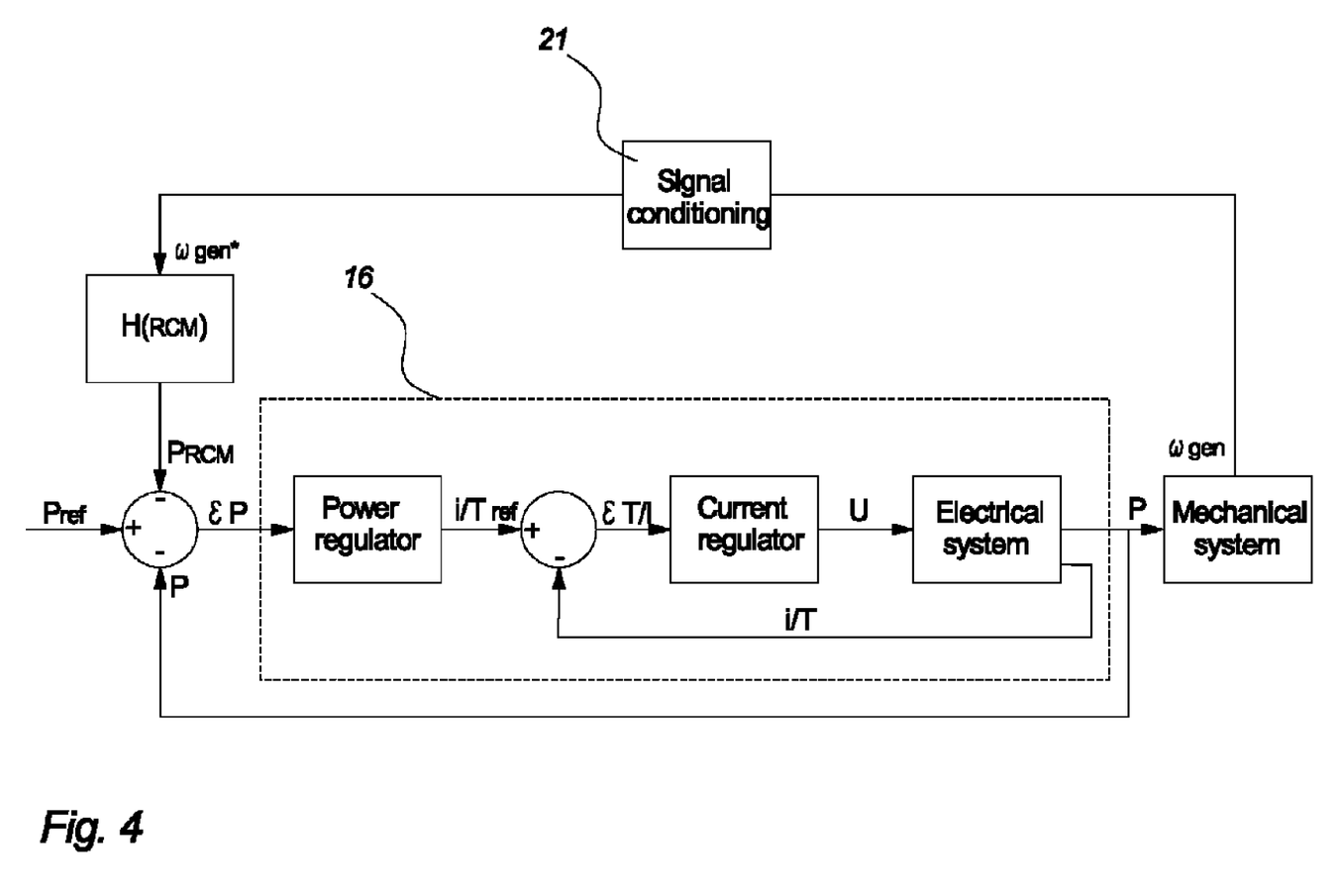
FIG. 4 illustrates schematically a control block diagram of a drive train oscillation compensation system according to one embodiment of the invention.

FIG. 4 illustrates schematically a control block diagram of a drive train oscillation compensation system according to one embodiment of the invention.

A power reference value $P_{ref}$ from e.g. a grid operator, park control, substation or individual wind turbine controller is received at the wind turbine and subtracted by a first value of the actual generated power P.

The actual rotational speed of the generator $\omega_{gen}$ is measured by measuring means, conditioned by signal condition means 21 and processed via resonant control means $H_{(RCM)}$ in order to produce a power feedback signal $P_{RCM}$ that is fed back and subtracted as a second value from said power reference demand value $P_{ref}$.

The combined modification of $P_{ref}$ by subtraction of both P and $P_{RCM}$ results in one power error input signal $\epsilon P$ to power controller 16 of the wind turbine 1.

One role of the power controller 16 is to minimize the power error signal $\epsilon P$ which is achieved by controlling parameters of the schematically illustrated components of the power controller 16.

The resonant control means $H_{(RCM)}$ may for various embodiments of the invention comprise one or more PI and/or PID controllers and for a preferred embodiment at least one of the said one or more PI and/or PID controllers is a resonant controller.

One prominent feature of the invented resonant control means is that it has a relative high gain at a given resonant frequency.

Another prominent feature of the invented resonant control means is that is has substantially zero phase shift at said given resonant frequency.

For various embodiments of the invention said resonant frequency is one fundamental resonance frequency of the drive train.

For one specific embodiment said one fundamental resonance frequency is the eigen frequency of the drive train.

For one embodiment of the invention said fundamental resonance frequency is a calculated value based on e.g. theoretical mechanical modeling.

For another embodiment of the invention said fundamental resonance frequency is based on empirical collected data and/or calculations.

For an even further embodiment of the invention the resonant frequency can be altered during operation.

For other embodiments the resonant frequency is other selective harmonic frequencies of the wind turbine.

One main advantage of the resonant control means is that it is suited to operate on selective harmonics and thus the resonant control means tuned for operating at the drive train eigen frequency will be able to diminish the influence of the drive train compensation on the power and the speed control of the turbine.

For one embodiment of the invention the resonant control means has the following transfer function:

$$H_{RCM}(S) = K_P + K_i \cdot \frac{2\omega_{CU}S}{S^2 + 2\omega_{CU}S + \omega_{DT}^2}$$

For even further embodiments of the invention the level of which the power feedback signal $R_{RCM}$ that is fed back and subtracted as a second value to the power reference value $P_{ref}$ is limited to a predefined level i.e. the $P_{RCM}$ signal can modify the power reference value $P_{ref}\pm$a certain amount only.

In this way the impact of the power reference modification on the generated power is limited and the generated power will fluctuate only limited as a result of the drive train oscillation compensation control.

The limitation of $P_{RCM}$ may for various embodiments be in the range of e.g. 0.1 to 25 percent of nominal power or generated power of the wind turbine, such as 5 percent.

For various embodiments of the invention said limits can be fixed, can be altered or can be adaptive during different operation conditions.

Figure 5A:
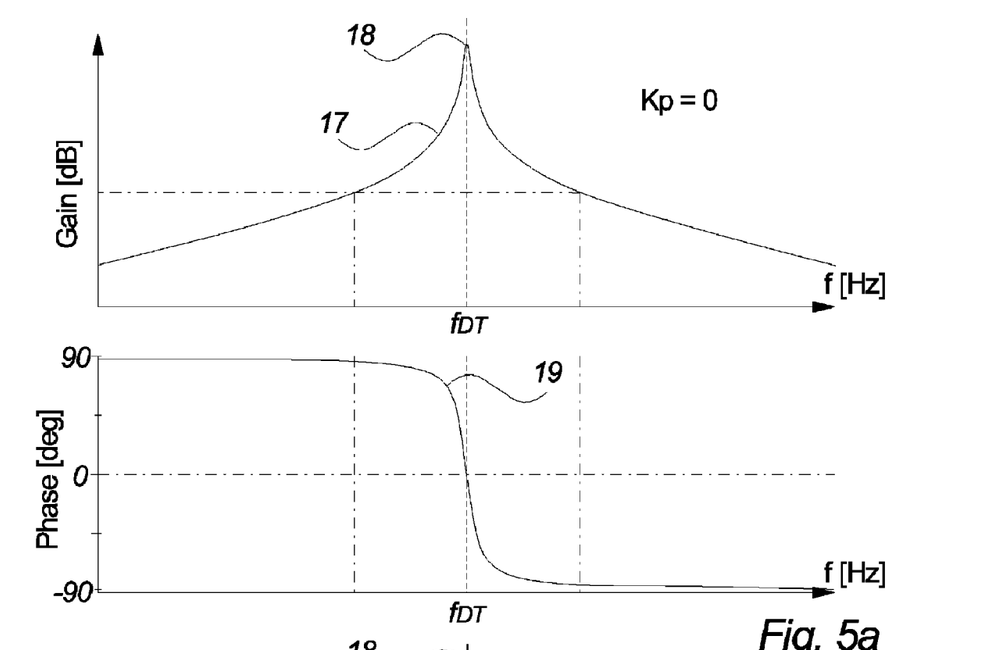
FIG. 5a illustrates a bode plot of the characteristics of a resonance control means with a first set of parameters according to one embodiment of the invention.
Figure 5B:
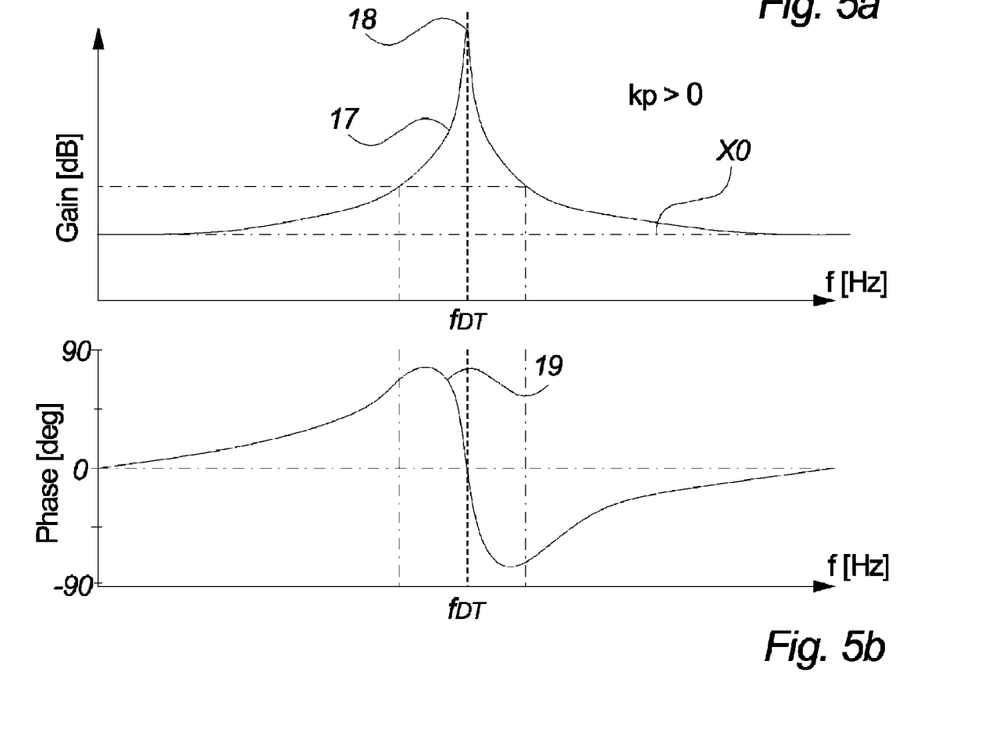
FIG. 5b illustrates a bode plot of the characteristics of a resonance control means with a second set of parameters according to another embodiment of the invention.
Figure 5C:
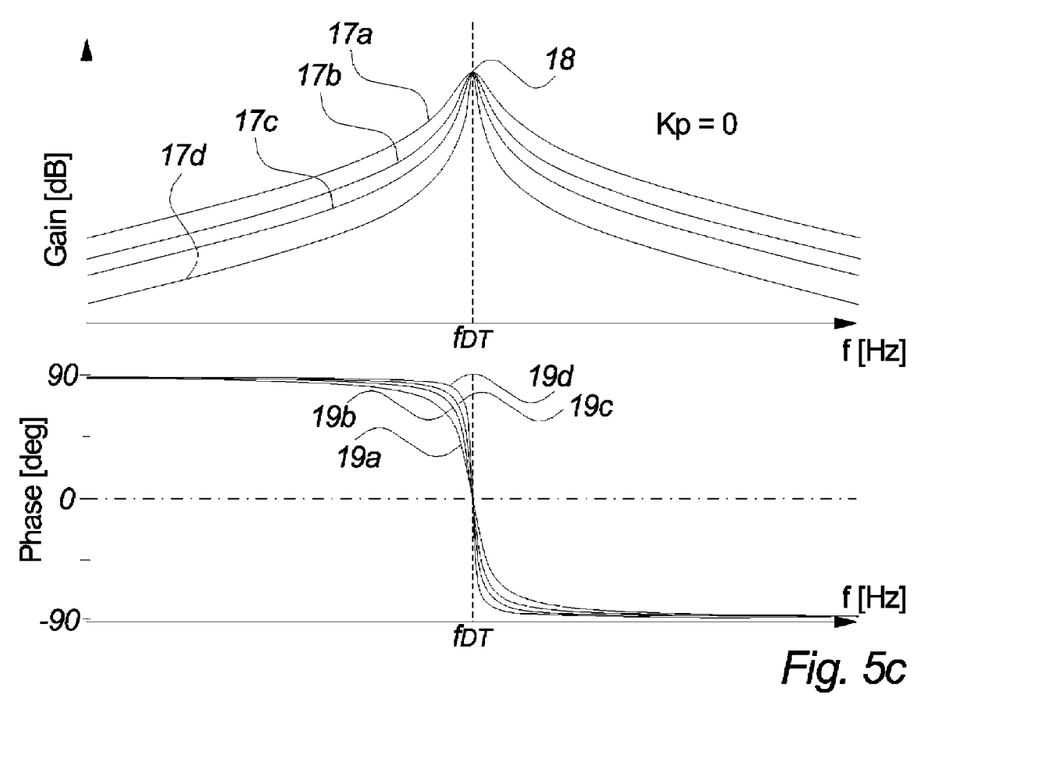
FIG. 5c illustrates various bode plots of the characteristics of a resonance control means according to other embodiments of the invention.

FIGS. 5a, 5b and 5c depicts some characteristics of this resonant control means.

At the resonant frequency $\omega_{DT}=2\pi f_{DT}$ the resonant control means has a relative high gain and the phase crosses zero. The further away from the resonant frequency the gain of the control means decreases drastically and for various embodiments converges towards a predefined gain value.

The operating parameters $K_p$ and $K_i$ are proportional gain and integral gain respectively. $\omega_{DT}$ is the resonant frequency which for various embodiments of the invention is equal to the drive train eigen frequency. $\omega_{CU}$ is a dampening operating parameter used to describe the sharpness of the characteristic near the resonant frequency.

For various embodiments of the invention the operating parameters of the resonant control means can be altered such as during operation.

Without dampening i.e. $\omega_{CU}=0$, the control means ideally has an infinite gain at the resonant frequency $\omega_{DT}$. A too high gain at the resonant frequency $\omega_{DT}$ will lead to a high span of the resonant control means parameters which in turn could invoke discrete implementation errors. It is therefore desirable for a practical implementation of the resonant control means to keep the gain at a moderate level.

The gain of the resonant control means can be formulated as to be:

$$\|H_{RCM}(j\omega)\| = \sqrt{\frac{\omega^2[2\omega_{CU}(K_p+K_i)]^2 + [K_p(\omega_{DT}^2-\omega^2)]^2}{\omega^2[2\omega_{CU}]^2 + [\omega_{DT}^2-\omega^2]^2}}$$

For various embodiments of the invention the gain of the control means at DC and at the resonant frequency is listed for $K_p=K_p$ and also for a pure harmonic compensator i.e. $K_p=0$:

| $K_p$ | $\omega$ | $\|H_{RCM}(j\omega)\|$ |
|---|---|---|
| $K_p$ | 0 | $K_p$ |
| $K_p$ | $\omega_{DT}$ | $K_p + K_i$ |
| 0 | 0 | 0 |
| 0 | $\omega_{DT}$ | $K_i$ |

Depending of the values of the parameters Kp and Ki, the charateristics of the resonant control means can be altered.

For a preferred embodiment of the invention the proportional parameter of the resonant control means Kp is chosen to be zero.

FIG. 5a illustrates the characteristics of a resonant control means of the invention loaded with parameters Kp=0 and Ki=Ki according to one embodiment of the invention.

At the resonant frequency $\omega_{DT}=2\pi f_{DT}$ the gain curve 17 of the resonant control means shows a prominent peak 18 and has a high gain equal to 20 log 10(Ki). The further away from the resonant frequency $\omega_{DT}$ the gain of the control means decreases drastically and decreases to zero at $\omega=0$.

At the resonant frequency $\omega_{DT}=2\pi f_{DT}$ the phase curve 19 crosses zero. For relative small variations around $\omega_{DT}$ i.e. within the bandwidth frequency limits, the phase the phase changes drastically.

For frequencies further away from the resonant frequency the phase curve 19 converges to ±90 degrees as indicated on the figure.

FIG. 5b illustrates schematically the characteristics of a resonant control means according to another embodiment of the invention for some fictive parameter settings where the operational parameter Kp>0.

One prominent feature of this embodiment is that at the resonant frequency $\omega_{DT}=2\pi f_{DT}$ the gain curve 17 of the resonant control means peaks 18 and has a high gain equal to 20 log 10(Kp+Ki) and the further away from the resonant frequency the gain of the control means converges towards the gain level denoted X0 which for this embodiment is 20 log 10(Kp).

Another prominent feature of this embodiment is that at the resonant frequency $\omega_{DT}=2\pi f_{DT}$ the phase curve 19 crosses zero. For relative small variations around $\omega_{DT}$ i.e. within the bandwidth frequency limits, the phase the phase changes drastically but for frequencies away form the resonant frequency the phase converges to 0 deg.

FIG. 5c illustrates bode plots of the characteristics of a resonance control means where the resonant control means of the invention is loaded with parameters Kp=0 and Ki=Ki for various values of $\omega_{CU}$ according to various embodiments of the invention.

The gain curves 17a-d in the figure illustrates how the sharpness of the gain curves is altered by changing $\omega_{CU}$ i.e. for increasing values of $\omega_{CU}$ the bandwidth of the control means is increased.

At the resonant frequency $\omega_{DT}=2\pi f_{DT}$ the gain curves 17a-d of the resonant control means shows a prominent peak 18 and has a high gain equal to 20 log 10(Ki). The further away from the resonant frequency WDT the gain of the control means decreases drastically and decreases to zero at $\omega=0$.

For all embodiments of this figure the phase curves 19a-d crosses zero at the resonant frequency $\omega_{DT}=2\pi f_{DT}$. For relative small variations around $\omega_{DT}$ the phase changes drastically and for frequencies further away form the resonant frequency the phase converges to ±90 degrees as illustrated on the figure.

For various embodiments the present invention may be implemented in various types of wind turbines and generator systems such as wind turbines comprising one or more doubly-fed induction generators or wind turbines comprising full scale power converter systems such as permanent magnet wind turbines.

What is claimed is:

1. A variable speed wind turbine connected to a utility grid including
    a rotor, comprising at least one blade,
    a drive train connected to said rotor, said drive train comprising a selection of at least one gear box, and at least one electrical generator,
    a measuring arrangement arranged to establish at least one rotational speed signal from the drive train, and
    at least one wind turbine power controller connected to said at least one generator and said utility grid, wherein said wind turbine further comprises at least one resonant controller arranged to modify a power reference value in response to said at least one rotational speed signal, and wherein one fundamental resonance frequency of said at least one resonant controller is one resonance frequency of the drive train.

2. The wind turbine according to claim 1, wherein said resonant controller comprises one or more PID controllers.

3. The wind turbine according to claim 1, wherein said resonant controller has a relative high gain at one resonance frequency of the drive train.

4. The wind turbine according to claim 1, wherein a bandwidth of said resonant controller can be altered by altering at least one operating parameter of said resonant controller.

5. The wind turbine according to claim 1, wherein a gain of said resonant controller at one resonance frequency can be altered by altering at least one operating parameter of said resonant controller.

6. The wind turbine according to claim 1, wherein a phase shift of said resonant controller at one resonance frequency of the drive train is substantially zero.

7. The wind turbine according to claim 1, wherein said resonant controller has a numerical increasing phase shift at frequencies away from one resonance frequency of the drive train.

8. The wind turbine according to claim 6, wherein a slope of the phase shift can be altered by altering at least one operating parameter of said resonant controller.

9. The wind turbine according to claim 1, wherein a transfer function of said resonant controller is in the form:

$$H_{RCM}(S) = K_P + K_i \cdot \frac{2\omega_{CU} S}{S^2 + 2\omega_{CU} S + \omega_{DT}^2}.$$

10. The wind turbine according to claim 1, wherein said one fundamental resonance frequency of said resonant controller is a calculated value.

11. The wind turbine according to claim 1, wherein said one fundamental resonance frequency of said resonant controller is a fixed value or can be altered during operation.

12. The wind turbine according to claim 1, wherein said resonance frequency is a predefined value, is estimated or is both predefined and estimated.

13. The wind turbine according to claim 1, wherein a level of which said at least one resonant controller modifies a power reference value is limited.

14. The wind turbine according to claim 1, wherein a level of which said at least one resonant controller modifies a power reference value is limited to be within a predefined level.

15. The wind turbine according to claim 14, wherein said predefined level is in the range of 0.1 to 25 percent of at least one of nominal and generated power of said wind turbine.

16. The wind turbine according to claim 1, wherein said measuring arrangement is an encoder operated on at least one of a low speed rotor shaft and a generator shaft.

17. The wind turbine according to claim 1, wherein said measuring arrangement establishes at least one rotational speed signal of the drive train by processing at least one electrical parameter of the wind turbine.

18. The wind turbine according to claim 1, wherein said power reference value is a power reference value of said power controller.

19. A resonant control system comprising
at least one power controller of a wind turbine, said at least one power controller being connected to at least one generator of said wind turbine and a utility grid,
wherein said resonant control system modifies a power reference value in response to at least one rotational speed signal of a drive train of said wind turbine, and
wherein one fundamental resonance frequency of said resonant control system is one resonance frequency of the drive train.

20. A method of operating a variable speed wind turbine connected to a utility grid, comprising the steps of
establishing at least one rotational speed signal of a drive train of said wind turbine,
processing said at least one rotational speed signal in at least one resonant controller wherein one fundamental resonance frequency of said resonant controller is one resonance frequency of said drive train, and
modifying a power reference value in response to said at least one processed rotational speed signal.

21. Use of the resonant control system of claim 19 in a variable speed wind turbine.

22. Use of the method of claim 20 in a variable speed wind turbine.

* * * * *